United States Patent [19]

Ichinose et al.

[11] 4,369,010
[45] Jan. 18, 1983

[54] REINFORCED VEHICLE FRAME AND TIE DOWN EYE STRUCTURE

[75] Inventors: Hisao Ichinose, Yokohama; Shinji Katou, Fujisawa; Masashi Matsui; Kouji Hori, both of Yokohama, all of Japan

[73] Assignee: Nissan Motor Co., Ltd., Yokohama, Japan

[21] Appl. No.: 161,480

[22] Filed: Jun. 20, 1980

[30] Foreign Application Priority Data

Jul. 6, 1979 [JP] Japan .................. 54-86136

[51] Int. Cl.³ .................. A44B 13/00; B60P 7/06; B61D 45/00
[52] U.S. Cl. .................. 410/101; 410/23; 410/102; 410/106; 410/115
[58] Field of Search .................. 410/10, 11, 23, 101, 410/106, 107, 108, 110, 111, 115, 102; 29/526 R; 105/197 DB; 228/135, 140; 248/500

[56] References Cited

U.S. PATENT DOCUMENTS

| | | | |
|---|---|---|---|
| 1,786,735 | 12/1930 | Copony | 410/10 |
| 2,073,349 | 3/1937 | Nampa | 410/11 |
| 2,322,576 | 6/1943 | Huebshman et al. | 410/23 |
| 2,517,411 | 8/1950 | Patterson | 248/500 X |
| 2,709,972 | 6/1955 | Ingram | 410/106 |
| 2,970,850 | 2/1961 | Blunden | 410/23 |
| 3,142,264 | 7/1964 | DeBoer | 410/106 |
| 3,719,045 | 3/1973 | Hoffman | 228/135 |
| 4,072,113 | 2/1978 | Thurston | 410/107 |
| 4,254,712 | 3/1981 | O'Neil | 105/197 DB |

FOREIGN PATENT DOCUMENTS 2406541  5/1979  France .................. 410/101

*Primary Examiner*—Robert B. Reeves
*Assistant Examiner*—Howard Beltran
*Attorney, Agent, or Firm*—James C. Wray

[57] ABSTRACT

A vehicle body structure at mounting portions of tractive or fastening hooks of an automobile comprises U-shaped members welded to vehicle body members whose joint flanges surrounded by the U-shaped members are formed with apertures to reinforce the joint flange by bolts passing through the apertures, thereby preventing separations and cracks in the joint flanges during a transport for a long distance.

10 Claims, 13 Drawing Figures

REINFORCED VEHICLE FRAME AND TIE DOWN EYE STRUCTURE

BACKGROUND OF THE INVENTION

1. Field of the Invention

The invention relates to a vehicle body structure at mounting portions of tractive hooks or fastening hooks of an automobile to be transported by land or sea.

2. Description of the Prior Art

FIGS. 1 and 2 exemplarily illustrate a prior art vehicle body structure of an automobile having fastening hooks of this kind. To a vehicle body member M of the automobile to be transported including a panel 1 of the body and a channel member (body stiffener member) 2 reinforcing the panel 1 to form a box-shaped cross-sectional portion is secured by welding for example arc welding at $W_1$ a U-shaped fastening member body 3 of a circular cross-sectional rod with its legs 3a and 3b such that its arm connecting these legs extends beyond an edge of the vehicle body member M. Arrows T in FIG. 1 illustrate tensile forces acting upon the fastening bodies when the vehicle body is fastened. With this construction, as the fastening members are only directly welded to the vehicle body, they contribute to saving the manufacturing cost and ensure a reliable transport for a short distance. However, they have a limitation of strength in a transport for a long distance. In case of, for example, an oversea transport, the proximity of the spot welded portion $W_2$ of the vehicle body member M lacks a required strength probably resulting in spot separations or cracks in the flange surrounded by the legs 3a of the fastening body 3. Therefore, reinforcement members welded to the weak portions of the vehicle body are required for a long distance transport, so that vehicle bodies are not common for the same type of automobiles, which is disadvantageous in manufacturing automobiles.

SUMMARY OF THE INVENTION

It is, therefore, an object of the invention to provide a vehicle body structure which is easily adapted for a transport for a short distance requiring only a relatively low strength or a long distance requiring a high strength of those portions of the vehicle body members to which are attached fastening hooks.

It is another object of the invention to provide a vehicle body structure comprising body members, to which are attached fastening hooks, having a strength sufficient to prevent the hook attached portions from being injured during a transport for a long distance.

The vehicle body structure according to the invention comprises U-shaped members welded to vehicle body members having box-shaped cross-sections such that lower ends of the U-shaped members extend beyond edges of the vehicle body to form respective eyes members, joint flanges of the vehicle body members surrounded by the U-shaped members being formed with apertures for passing bolts therethrough, whereby the joint flanges are clamped by the bolts passing through the apertures thereof to reinforce the joint flanges so as to prevent cracks therein in transporting the vehicle for a long distance, but the apertures of the joint flanges are not used in transporting for a short distance.

The invention will be more fully understood by referring to the following detailed specification and claims taken in connection with the appended drawings.

Figure 1:
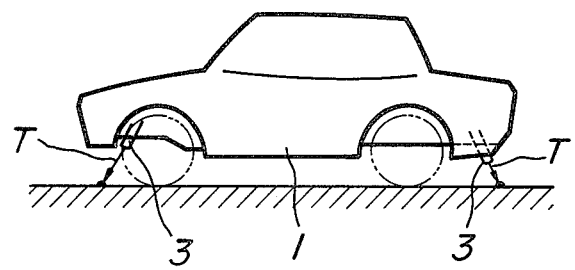
FIG. 1 is an elevation of an automobile including fastening hooks for transporting the automobile as mentioned above.
Figure 2:
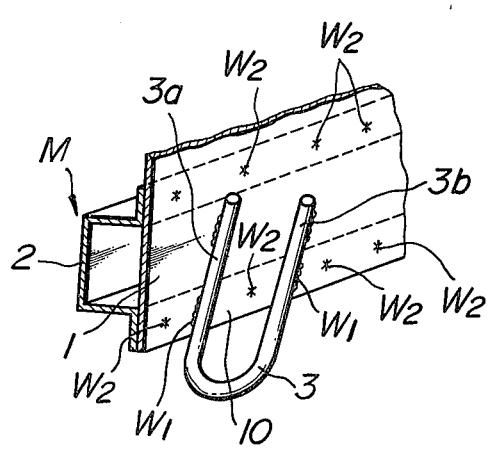
FIG. 2 is a partially sectional perspective view of a vehicle body structure of the prior art as mentioned above.

In the drawings, like components have been designated by the same reference numrals.

DETAILED DESCRIPTION OF THE PREFERRED EMBODIMENT

Figure 3A:
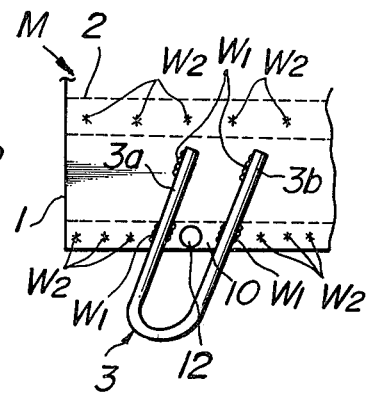
FIG. 3a is a front elevation of a main part of a body structure of the first embodiment of the invention without a reinforcement.
Figures 3B, 3C:
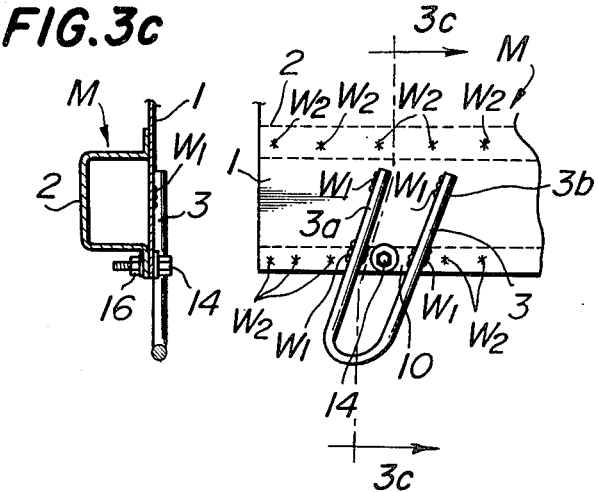
FIG. 3b is a front elevation of the main part of the body structure of the first embodiment reinforced by a bolt and a nut.
FIG. 3c is a sectional view taken along the line 3c—3c of FIG. 3b.

Referring to FIGS. 3a–3c showing a first embodiment of the invention, a joint flange 10 is formed in the portions surrounded by legs 3a and 3b of U-shaped fastening member bodies 3 with respective apertures 12 for passing bolts therethrough. In case of a transport for a short distance which requires only a relatively low strength of the portions, the apertures 12 are not used as shown in FIG. 3a. In case of requiring a high strength for that portion as in a long distance transport, the joint flange 10 is clamped by bolts 14 passing through the apertures 12 and nuts 16 as shown in FIGS. 3b and 3c. In this manner the clamping force of the bolts 14 and nuts 16 prevents the separation of the panel and cracks in the joint flange 10 during the transport for the long distance.

Figure 4A:
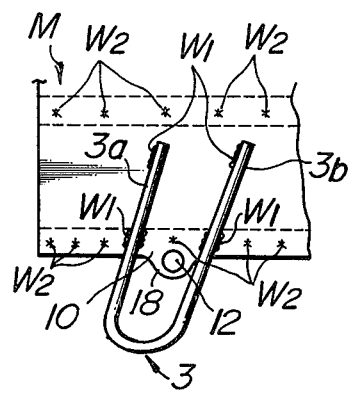
FIG. 4a is a front elevation of a main part of a body structure of the second embodiment of the invention without a reinforcement.
Figures 4B, 4C:
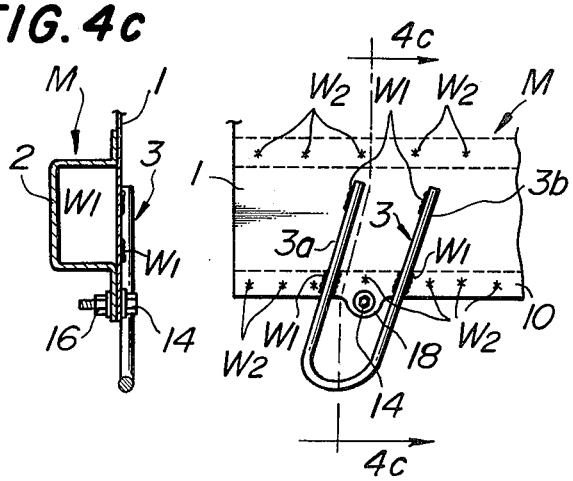
FIG. 4b is a front elevation of the main part of the body structure of the second embodiment reinforced by a bolt and a nut.
FIG. 4c is a sectional view taken along the line 4c—4c of FIG. 4b.

Referring to FIGS. 4a–4c illustrating a second embodiment of the invention, a joint flange 10 of a vehicle body member M is partly formed at locations surrounded by the legs 3a and 3b of the U-shaped members 3 with protrusions 18 which are then formed with apertures for passing bolts therethrough. In this case, at locations of the protrusions 18 the channel member 2 is also spot welded at $W_2$ to the panel 1.

FIG. 4a illustrates the joint flange portion of a vehicle to be transported for a short distance which requires only a relatively low strength. FIGS. 4b and 4c show the joint flange portion champed by a bolt 14 and a nut 16 of a vehicle to be transported for a long distance which requires a high strength of the flange portion. The clamping force of the bolts 14 prevents the separation of the panel and cracks in the joint flange.

In comparison with the first embodiment, this second embodiment is more advantageous for the strength increased by the spot welding $W_2$ on the joint flange 10 surrounded by the legs 3a and 3b of the U-shaped member 3.

Figure 5A:
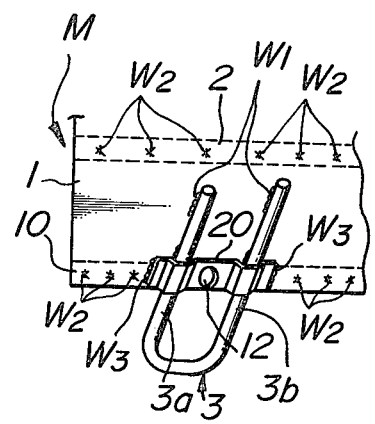
FIG. 5a is a front elevation of a main part of a body structure of the third embodiment of the invention.
Figures 5B, 5C:
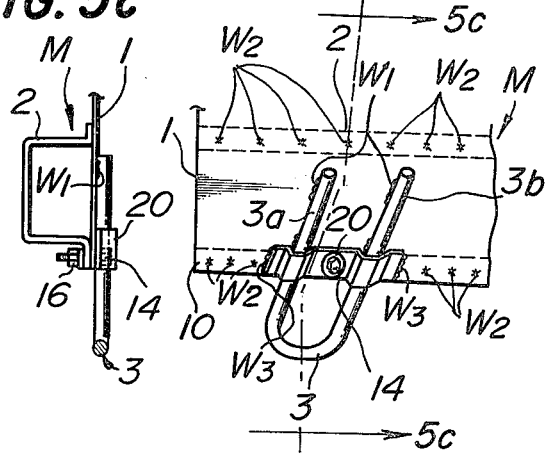
FIG. 5b is a front elevation of the main part of the body structure of the third embodiment reinforced by a bolt and a nut.
FIG. 5c is a sectional view taken along the line 5c—5c of FIG. 5b.

Referring to FIGS. 5a–5c illustrating a third embodiment of the invention, a plate band 20 is arranged over legs 3a and 3b of a U-shaped member 3 and welded to the joint flange 10 at $W_3$ as by arc welding to reinforce the U-shaped member mounting portion of the vehicle body member M.

The band plate 20 and joint flange 10 of the vehicle body member M surrounded by the legs 3a and 3b of the U-shaped member 3 are formed with apertures 12 for passing bolts therethrough.

When an automobile whose body includes the plate bands of this embodiment is transported for a short distance, the apertures 12 for the bolts are not used as shown in FIG. 5a. In case of a transport for a long distance, the plate band 20 and joint flange 10 are clamped by bolts 14 and nuts 16 as shown in FIGS. 5b and 5c.

In this embodiment, the welding $W_3$ of the plate band 20 to the panel 1 increases the strength of the legs 3a and 3b of the hook 3 to distribute the forces acting upon the joint flange 10 over the plate band, thereby more remarkably eliminating separations at welded portions and cracks in comparison with the first and second embodiments.

Figure 6:
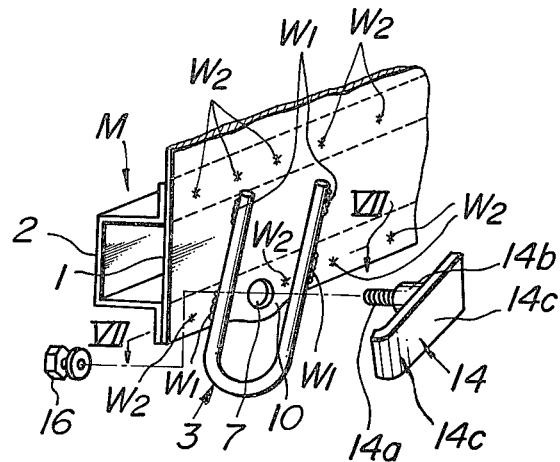
FIG. 6 is a partially sectional perspective view of a main part of a body structure of the fourth embodiment of the invention.
Figure 7:
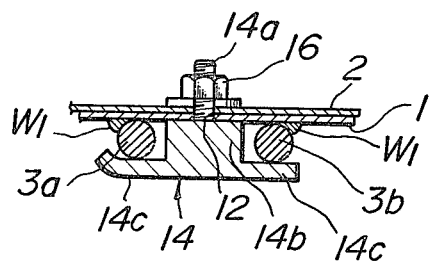
FIG. 7 is a partial sectional view taken along the line VII—VII in FIG. 6.

Referring to FIGS. 6 and 7 illustrating a fourth embodiment of the invention, including a bolt and a nut for a transport for a long distance, a joint flange 10 of a vehicle body member M is formed in the portions surrounded by legs 3a and 3b of U-shaped members 3 with apertures for passing the bolts. The bolt 14 comprises a threaded shank 14a and a head 14b whose upper edges extend to form extensions 14c embracing the legs of the U-shaped member 3 between the extensions and a panel 1.

Therefore, the bolt 14 and nut 16 clamp the joint flange 10 of the vehicle body member M and the extensions 14c of the bolt 14 clamps the legs 3a and 3b of the U-shaped member 3.

It should be understood that the vehicle body structure according to the invention may be constructed by a combination of the second, third and fourth embodiments, which is not shown.

As can be seen from the above description, the apertures formed in the joint flange of the vehicle body member for passing bolts therethrough are not used for a transport for a short distance which requires only a relatively low strength of the flange, while in case of a transport for a long distance which requires a higher strength of the flange, the bolts passing through the apertures clamp the joint flange to reinforce it, so that the vehicle body structures of both the cases are in common and the vehicle including the body structure according to the invention can be transported for a long distance without any separations at spot welded portions of and cracks in the flange of the vehicle body member. In a short distance transport, on the contrary, what is extra is apertures for passing bolts therethrough which never increases the manufacturing cost.

In the event that vehicles on the way of a transport for a short distance are required to be transported for a long distance, the strength of the vehicle bodies can be increased to an extent required for the long distance transport only by clamping the bodies by means of bolts, if required.

Although the invention has been explained as to the fastening hooks for a transport, it may be applied to tractive hooks for a traction in the same manner.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An automobile body structure comprising a channel member with flanges extending outwardly at an open portion thereof, a plate welded to the flanges closing the channel member to form a beam member having a closed cross section, a U-shaped eye member welded to the plate and extending past an edge of one of the flanges, a bolt passing through said plate and one flange and between legs of the eye member to reinforce the beam member at points receiving stress applied to the eye member.

2. A body structure as set forth in claim 1, further comprising a nut connected to the bolt for clamping said plate and one flange between the nut and a head of the bolt.

3. A body structure as set forth in claim 1, wherein parts of said one flange extend to form a protrusion through which said bolt passes.

4. A body structure as set forth in claim 1, wherein a plate band is arranged over the legs of said eye member and welded to said plate, the bolt passing through said plate band.

5. A body structure as set forth in claim 1, wherein a head of said bolt extends substantially perpendicularly to the bolt axis to form an extension embracing the legs of said eye member and clamping said legs between said extension and said plate.

6. In an automobile body structure having a channel member with a flanged open side, a panel covering the open side of the channel member and being fixed to said flange to form a joint flange, a U-shaped member having legs welded to the panel and a bight extending beyond an edge of the joint flange to form an eye configured to receive means subjecting the U-shaped member to forces in transportation of the vehicle, the improvement comprising
   an aperture formed in the joint flange between the legs of the U-shaped member,
   a bolt selectively received in the aperture,
   a nut connected to a bolt received in the aperture for reinforcingly clamping the panel and channel member flange between the nut and a head of the bolt, and said nut and bolt being primarily used over long distances of transportation.

7. A body structure as set forth in claim 6, wherein parts of said joint flange extend to form a protrusion in which said aperture is formed.

8. A body structure as set forth in claim 6, wherein a plate band is arranged over the legs of said U-shaped member and welded to said joint flange, said plate band having an aperture aligned with the aperture in the joint flange.

9. A body structure as set forth in claim 6, wherein the head of said bolt extends substantially perpendicularly to the bolt axis to form an extension embracing the legs of said U-shaped member and clamping said legs between said extension and said joint flange.

10. A body structure as set forth in claim 6, wherein said channel member is welded to said panel.

* * * * *